(12) United States Patent
Glickman et al.

(10) Patent No.: US 10,982,914 B2
(45) Date of Patent: Apr. 20, 2021

(54) ENGINE COOLING ASSEMBLY

(71) Applicant: Ford Global Technologies, LLC, Dearborn, MI (US)

(72) Inventors: David Brian Glickman, Southfield, MI (US); Sean Terence Coghlan, Dearborn, MI (US); Darshan Arun Nayak, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 16/216,590

(22) Filed: Dec. 11, 2018

(65) Prior Publication Data

US 2020/0182563 A1  Jun. 11, 2020

(51) Int. Cl.
| | |
|---|---|
| *F28D 1/047* | (2006.01) |
| *F28F 9/013* | (2006.01) |
| *F28F 1/10* | (2006.01) |
| *F28F 9/26* | (2006.01) |
| *B60K 11/04* | (2006.01) |
| *F28F 1/24* | (2006.01) |

(Continued)

(52) U.S. Cl.
CPC .............. *F28F 9/013* (2013.01); *B60K 11/04* (2013.01); *B62D 25/084* (2013.01); *F28D 1/0472* (2013.01); *F28D 1/0473* (2013.01); *F28D 1/0478* (2013.01); *F28F 1/10* (2013.01); *F28F 1/24* (2013.01); *F28F 9/26* (2013.01); *F28D 2021/0084* (2013.01); *F28D 2021/0094* (2013.01); *F28F 2250/02* (2013.01)

(58) Field of Classification Search
CPC ....... B60K 11/04; B62D 25/084; F28F 9/002; F28F 9/013; F28F 2250/02; F28D 1/047; F28D 1/0472; F28D 1/024; F28D 1/0473; F28D 2021/0084; F28D 2021/0094
See application file for complete search history.

(56) References Cited

U.S. PATENT DOCUMENTS 2,300,634 A  *  11/1942  Schoenfeld ............... 122/250 R
4,510,991 A       4/1985  Kawahira
(Continued)

FOREIGN PATENT DOCUMENTS

| DE | 2518730 A1 | * | 11/1976 | ............. F25B 39/02 |
|---|---|---|---|---|
| JP | 06317151 A | * | 11/1994 | |
| SU | 1828535 A3 | * | 7/1993 | |

OTHER PUBLICATIONS

Charles, C., "Design of Circular Radiator," Tech Briefs Website, Available Online at https://contest.techbriefs.com/2016/entries/automotive-transportation/7068, Jun. 30, 2016, 2 pages.

*Primary Examiner* — Eric S Ruppert
(74) *Attorney, Agent, or Firm* — David Coppiellie; McCoy Russell LLP

(57) ABSTRACT

Methods and systems are provided for a cooling module assembly for a vehicle. In one example, the cooling module assembly includes a first set of fins arranged in a circle, configured to flow a first fluid through a first sinusoidal, continuous inner passage, and a second set of fins, also arranged in a circle and configured to flow a second fluid through a second sinusoidal, continuous inner passage. The second set of fins shares a common plane with the first set of fins and is arranged concentric about the first set of fins.

20 Claims, 8 Drawing Sheets

(51) Int. Cl.
 *B62D 25/08* (2006.01)
 *F28D 21/00* (2006.01)

(56) References Cited

U.S. PATENT DOCUMENTS

| | | | |
|---|---|---|---|
| 4,685,513 A * | 8/1987 | Longhouse | F01P 5/06 |
| | | | 123/41.49 |
| 5,765,630 A | 6/1998 | Bloomer | |
| 2002/0070062 A1* | 6/2002 | Joutaki | B62D 29/004 |
| | | | 180/68.4 |
| 2017/0010046 A1* | 1/2017 | Hofbauer | F28F 1/04 |
| 2018/0112932 A1 | 4/2018 | Turney et al. | |
| 2019/0293364 A1* | 9/2019 | Stockton | F28F 1/025 |

* cited by examiner

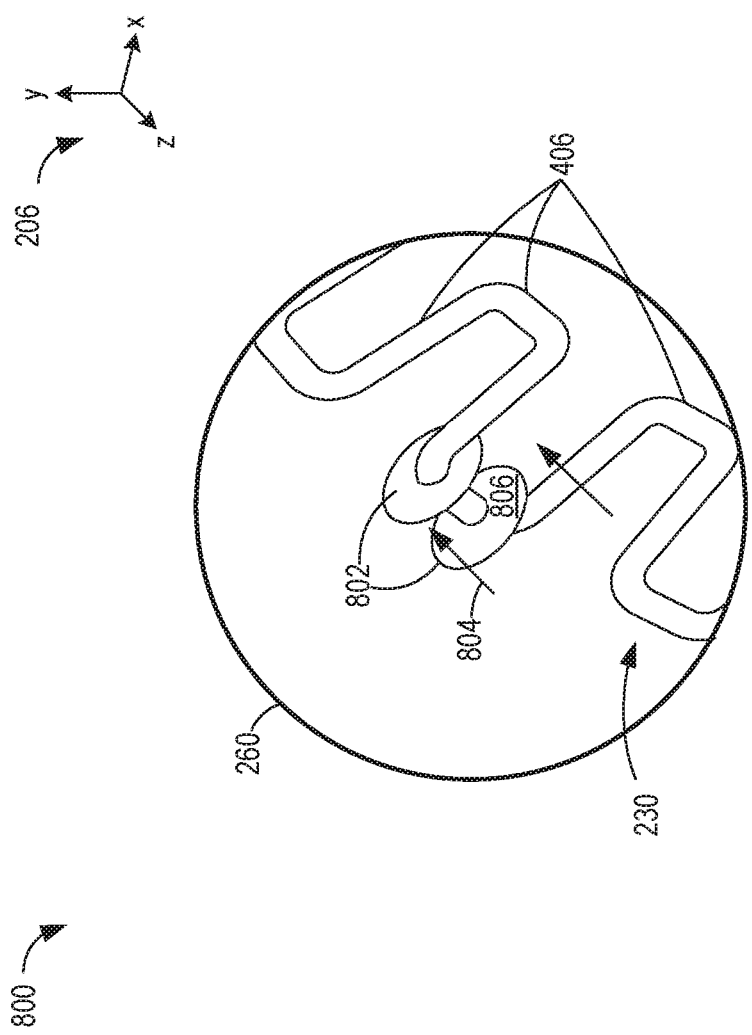

ENGINE COOLING ASSEMBLY

FIELD

The present description relates generally to a cooling module assembly for a vehicle.

BACKGROUND/SUMMARY

A continual demand for improvements to fuel economy and reduction of emissions has driven the automotive market to prioritize production of lightweight and compact vehicles. While strides have been made in reducing fuel consumption and release of undesirable combustion products, packaging of vehicle components within smaller compartment allowances presents a new set of challenges for automotive manufacturers. In particular, a geometry of a vehicle's front end may be dependent on a volume occupied by bulky and heavy components including a cooling system, radiators, active grille shutters (AGS), an air conditioning system, auxiliary coolers, and supporting hardware such as brackets and bolsters.

Engine cooling systems typically comprise at least one radiator and one condenser, the radiator coupled to a vehicle front end and configured to flow to an engine block coolant and the condenser also coupled to the vehicle front end and configured to flow refrigerant to an air conditioning evaporator. The radiator and condenser may have planar, rectangular structures, arranged perpendicular to air flow (e.g., ram-air) in the vehicle front end and stacked along a horizontal direction to allow for simpler packaging. Both the radiator and the condenser may rely on liquid-to-air heat exchange to cool the engine block and an interior of the vehicle, respectively. Transfer of heat from the refrigerant and the coolant to air may be enhanced by using a cooling fan to increase air flow across surfaces of the radiator and the condenser. However, certain regions of the rectangular radiator and condenser, such as the corners, may not be within a sweep of the cooling fan, and may therefore lose heat at a reduced rate.

Furthermore, a positioning of the radiator behind the condenser in the path of ram air results in heating of air by the condenser before the air comes into contact with the radiator. In some examples, auxiliary coolers, such as a charge air cooler, an oil cooler, a transmission fluid cooler, etc., may be positioned between the condenser and the radiator, further reducing a temperature differential between the air flowing to the radiator and the radiator coolant channels and diminishing a cooling capacity of the radiator. To compensate for inefficient heat exchange at the radiator, the radiator size may be increased to augment an available surface area of the radiator for cross-flow heat exchange, further compounding difficulties associated with installing both the enlarged radiator and the condenser within a restricted space.

Attempts to address inefficient cooling resulting from a geometry and positioning of the cooling module assembly includes configuring a heat exchanger to have a circular geometry. One example approach is shown by Kawahira in U.S. Pat. No. 4,510,991. Therein, a heat exchanger, such as a radiator or condenser, may have a plurality of concentrically arranged, circular flat pipes, the pipes adapted with passages for coolant flow therethrough. The concentric, circular flat pipes are co-axially arranged and equidistant apart, each of the circular flat pipes adapted with coolant inlets. Corrugated fins are disposed in the spaces between the circular flat pipes. Alternatively, a single flat pipe may be spirally wound to form a similarly circular heat exchanger with corrugated fins interposed between adjacent portions of the flat pipe. The flat pipe has a single coolant inlet to deliver coolant to the heat exchanger. The circular structure removes inefficiently cooled corners of the heat exchanger are thus removed and an amount of space occupied by a cooling fan may be further reduced by inserting a rotary shaft or motor of the fan into a central aperture of the circular heat exchanger.

However, the inventors herein have recognized potential issues with such systems. As one example, while the circular geometry eliminates regions unaffected by the cooling fan, a positioning of the condenser in front of the radiator nonetheless warms air flowing to the radiator. In addition, the concentric or spiraling geometry of the flat pipe(s) of the circular heat exchanger may not have sufficient tensile strength to withstand impact resulting from closing of a vehicle hood. The hood may come into contact with an upper portion of the heat exchanger when closed and in heavy-duty vehicles such as trucks with large and heavy hoods, closing of the hood may compress and degrade the heat exchanger. As a result, frequent repair and/or replacement of the heat exchanger may be demanded.

In one example, the issues described above may be addressed by a method for an integrated cooling system comprising a frame with an upper bracket, a lower bracket, an inner rim and an outer rim, a first continuous passage coupled to the frame as a first meander line having a first radius and circulating a first fluid, and a second continuous passage coupled to the frame as a second meander line having a second, larger radius, the second passage circulating a second fluid and arranged co-planar with the second passage. In this way, both the condenser and radiator receive maximum cooling from contact with ram air while coupled to a structure with high load-bearing capability.

As one example, the radiator, formed from a first cooling channel, and the condenser, formed from a second cooling channel, may together provide a circular cooling module assembly with the condenser concentric about the radiator and both components sharing a common plane. The cooling module assembly may receive ram-air across the plane of the cooling pack, in a direction perpendicular to the plane, allowing the radiator to be cooled by air that has not previously extracted heat from the condenser. A durable frame with high tensile strength may be included in the cooling module assembly, dispersing forces imposed on the cooling module assembly via radial spokes of the frame, and reducing impact experienced by the radiator and condenser. By configuring the cooling pack with the condenser circumferentially surrounding the radiator, an amount of space occupied by the cooling pack in a vehicle's front end may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows an expanded view of a cooling channel of the cooling module assembly.

FIGS. 2-8 are shown approximately to scale

DETAILED DESCRIPTION

Figure 1:
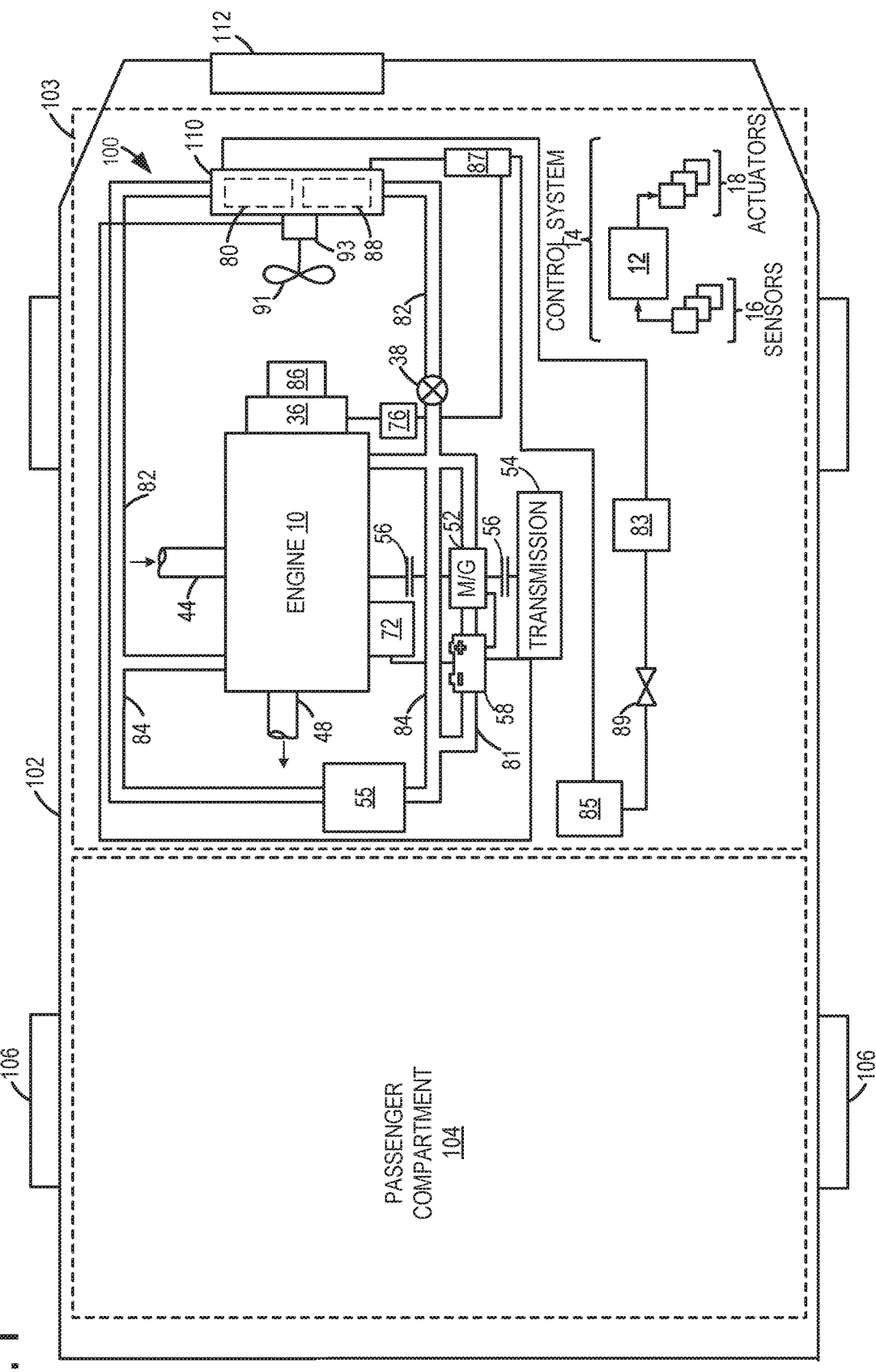
FIG. 1 shows a schematic diagram of an example of a vehicle including an associated cooling system.

The following description relates to systems and methods for a cooling system for a vehicle. The vehicle may include a number of front end components, as shown in FIG. 1, including a cooling module assembly (CMA) as a cooling system for both an engine of the vehicle and a passenger compartment. The CMA may have a circular geometry with a radiator and condenser sharing a common plane, as shown in a front perspective view of the CMA in FIG. 2. A fan may be coupled to a rear side of the CMA, as shown in a rear perspective view of the CMA in FIG. 3, to draw air through the CMA and promote liquid-to-air cooling. A direct rear view is shown in FIG. 4, indicating dispersion of a load imposed on the CMA through a frame of the CMA. The radiator and condenser may be formed from hollow fins arranged in a radial pattern in the cooling module assembly that are adapted with channels for flowing fluids, such as the coolant or the refrigerant. A cross-section of one of the fins is shown in a schematic illustration in FIG. 5. An expanded view of the fins is shown in FIG. 8, depicting perpendicularly arranged vanes along surfaces of the fins. By adapting the cooling module assembly with hollow fins and positioning the radiator and condenser along the common plane, an amount of space occupied by the cooling module assembly may be reduced relative to a conventional arrangement where the radiator and condenser are stacked in front of an engine in the vehicle's front end. A profile view of the cooling module assembly is provided in FIG. 6 to illustrate a footprint of a cooling module assembly. The cooling module assembly is further depicted in FIG. 7 relative to other vehicle front end components such as various supporting structures.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 is a schematic depiction of an example embodiment of a vehicle cooling system 100 in a motor vehicle 102. Vehicle 102 has wheels 106, a passenger compartment 104, and an under-hood compartment 103. Under-hood compartment 103 may house various under-hood components under the hood (not shown) of motor vehicle 102. For example, under-hood compartment 103 may house an internal combustion engine 10. Internal combustion engine 10 has a combustion chamber that may receive intake air via an intake passage 44 and may exhaust combustion gases via an exhaust passage 48. In one example, intake passage 44 may be configured as a ram-air intake, wherein the dynamic pressure created by moving vehicle 102 may be used to increase a static air pressure inside the engine's intake manifold. As such, this may allow a greater mass flow of air through the engine, thereby increasing engine power. Vehicle 102 as illustrated and described herein may be a road automobile, among other types of vehicles. While the example applications of engine 10 will be described with reference to vehicle 102, it should be appreciated that various types of engines and vehicle propulsion systems may be used, including passenger cars, trucks, etc.

In some examples, vehicle 102 may be a hybrid electric vehicle (HEV) with multiple sources of torque available to one or more of wheels 106. In other examples, vehicle 102 is a conventional vehicle with only an engine or an electric vehicle with only an electric machine(s). In the example shown, vehicle 102 includes engine 10 and an electric machine 52. Electric machine 52 may be a motor or a motor/generator. A crankshaft (not shown) of engine 10 and electric machine 52 are connected via transmission 54 to vehicle wheels 106 when one or more clutches 56 are engaged. In the depicted example, a first clutch 56 is provided between engine 10 (e.g., between the crankshaft of engine 10) and electric machine 52, and a second clutch 56 is provided between electric machine 52 and transmission 54. A controller 12 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 106. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 72.

Alternator 72 may be configured to charge system battery 58 using engine torque via the crankshaft during engine running. In addition, alternator 72 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 72 in order to regulate the power output of the alternator based upon system usage requirements, including auxiliary system demands.

Under-hood compartment 103 may further include cooling system 100, which includes a cooling module assembly (CMA) 110 with an integrated radiator 80 and condenser 88. The CMA 110 may be configured as a single unit that incorporates both the radiator 80 and the condenser 88 in a continuous, unitary structure. The radiator 80 and the condenser 88 may both be arranged within an outer frame, or bolster, of the CMA 110, forming a circular region of the CMA 110. The radiator 80 may be inside of and concentric with the condenser 88, both components sharing a common plane and arranged co-planar. For example, the radiator 80 may form an inner ring of cooling fins and the condenser 88 may form an outer ring of cooling fins, both the radiator 80 and the condenser 88 spiraling within a vertical plane. Further details of the CMA 110 are provided with reference to FIGS. 2 to 8 below.

The cooling system 100 circulates coolant through internal combustion engine 10 to absorb waste heat and distributes the heated coolant to the radiator 80 and/or a heater core 55 via coolant lines 82 and 84, respectively. In one example, as depicted, cooling system 100 may be coupled to engine 10 and may circulate engine coolant from engine 10 to radiator 80 via an engine-driven water pump 86 and back to engine 10 via coolant line 82. Engine-driven water pump 86 may be coupled to the engine via a front end accessory drive (FEAD) 36 and rotated proportionally to engine speed via a belt, chain, etc. Specifically, engine-driven pump 86 may circulate coolant through passages in the engine block, head, etc., to absorb engine heat, which is then transferred via radiator 80 to ambient air. In one example, where engine-driven water pump 86 is a centrifugal pump, the pressure (and resulting flow) produced by the pump may be proportional to the crankshaft speed, which in the example of FIG. 1, may be directly proportional to the engine speed. The temperature of the coolant may be regulated by a thermostat valve 38, located in cooling line 82, which may be kept closed until the coolant reaches a threshold temperature.

Coolant may flow through coolant line 82, as described above, and/or through coolant line 84 to heater core 55 where the heat may be transferred to passenger compartment 104 before the coolant flows back to engine 10. Coolant may additionally flow through a coolant line 81 and through one or more of electric machine (e.g., motor) 52 and system battery 58 to absorb heat from the one or more of electric machine 52 and system battery 58, particularly when vehicle 102 is an HEV or an electric vehicle. In some examples, engine-driven water pump 86 may operate to circulate the coolant through each of coolant lines 81, 82, and 84.

Condenser 88 is further coupled to an air conditioning (AC) system comprising a compressor 87, a receiver drier 83, an expansion valve 89, and an evaporator 85 coupled to a blower (not shown). Compressor 87 may be coupled to engine 10 via FEAD 36 and an electromagnetic clutch 76 (also known as compressor clutch 76), which allows the compressor to engage or disengage from the engine based on when the air conditioning system is turned on and switched off. Compressor 87 may pump pressurized refrigerant to condenser 88, mounted at the front of the vehicle. Condenser 88 may be cooled by cooling fan 91, thereby, cooling the refrigerant as it flows through. The high pressure refrigerant exiting condenser 88 may flow through receiver drier 83 where any moisture in the refrigerant may be removed by the use of desiccants. Expansion valve 89 may then depressurize the refrigerant and allow it to expand before it enters evaporator 85 where it may be vaporized into gaseous form as passenger compartment 104 is cooled. Evaporator 85 may be coupled to a blower fan operated by a motor (not shown), which may be actuated by system voltage.

One or more blowers (not shown) and cooling fans may be included in cooling system 100 to provide airflow assistance and augment a cooling airflow through the under-hood components. For example, cooling fan 91, coupled to the CMA 110, may be operated when the vehicle is moving and the engine is running to provide cooling airflow assistance through radiator 80. The cooling fan 91 may be coupled behind the CMA 110 (when looking from a grille 112 toward engine 10). In one example, cooling fan 91 may be configured as a bladeless cooling fan. That is, the cooling fan may be configured to emit airflow without the use of blades or vanes, thereby creating an airflow output area that is absent of vanes or blades. Cooling fan 91 may draw a cooling airflow into under-hood compartment 103 through an opening in the front-end of vehicle 102, for example, through grille 112. Such a cooling airflow may then be utilized by radiator 80, condenser 88, and other under-hood components (e.g., fuel system components, batteries, etc.) to keep the engine and/or transmission cool. Further, the airflow may be used to reject heat from a vehicle air conditioning system to which condenser 88 is coupled. Further still, the airflow may be used to increase the performance of a turbocharged/supercharged engine that is equipped with intercoolers that reduce the temperature of the air that goes into an intake manifold of the engine. While this embodiment depicts one cooling fan, other examples may use more than one cooling fan.

Cooling fan 91 may be coupled to battery-driven motor 93. Motor 93 may be driven using power drawn from system battery 58. In one example, system battery 58 may be charged using electrical energy generated during engine operation via alternator 72. For example, during engine operation, engine generated torque (in excess of what is required for vehicle propulsion) may be transmitted to alternator 72 along a drive shaft (not shown), which may then be used by alternator 72 to generate electrical power, which may be stored in an electrical energy storage device, such as system battery 58. System battery 58 may then be used to activate battery-driven (e.g., electric) fan motor 93. In other examples, the cooling fan may be operated by enabling a variable speed electric motor coupled to the cooling fan 91. In still other examples, cooling fan 91 may be mechanically coupled to engine 10 via a clutch (not shown), and operating the cooling fan may include mechanically powering rotation from engine rotational output via the clutch.

System voltage from the system battery 58 may also be used to operate other vehicle components such as an entertainment system (radio, speakers, etc.), electrical heaters, windshield wiper motors, a rear window defrosting system, and headlights.

FIG. 1 further shows a control system 14. Control system 14 may be communicatively coupled to various components of engine 10 to carry out the control routines and actions described herein. For example, as shown in FIG. 1, control system 14 may include controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, engine speed, engine temperature, ambient temperature, intake air temperature, etc.), cooling system sensors (such as coolant temperature, fan speed, passenger compartment temperature, ambient humidity, etc.), and others (such as Hall Effect current sensors from the alternator and battery, a system voltage regulator, etc.). Further, controller 12 may communicate with various actuators 18, which may include engine actuators (such as fuel injectors, an electronically controlled intake air throttle plate, spark plugs, etc.), cooling system actuators (such as motor actuators, motor circuit relays, etc.), and others. As an example, controller 12 may send a signal to an actuator of clutch 56 to engage or disengage the clutch, so as to connect or disconnect the crankshaft of engine 10 from transmission 54 and the components connected thereto. In some examples, the storage medium may be programmed with computer readable data representing instructions executable by the processor for performing the methods described below as well as other variants that are anticipated but not specifically listed.

Controller 12 may also adjust the operation of cooling fan 91 based on vehicle cooling demands, vehicle operating conditions, and in coordination with engine operation. In one example, during a first vehicle moving condition, when the engine is operating and vehicle cooling and airflow assistance from the fan is desired, cooling fan 91 may be powered by enabling battery-driven motor 93 to provide airflow assistance in cooling under-hood components. The first vehicle moving condition may include, for example, an engine temperature or coolant temperature that is above a threshold temperature. The threshold temperature may refer to a non-zero, positive temperature value above which airflow assistance is provided for engine cooling in order to avoid engine overheating, for example. In another example, during a second vehicle moving condition, when airflow assistance is not desired (for example, due to sufficient vehicle motion-generated airflow through the under-hood compartment), fan operation may be discontinued by disabling the fan motor.

A rise in popularity of compact, lightweight, and fuel-efficient vehicles may present challenges for automotive manufacturers to produce vehicles that meet such consumer demands while possessing sufficient space to enable packaging of indispensable vehicle components. In particular, a front end of the vehicle may house numerous parts in addition to the vehicle's engine that allow efficient and reliable operation of the vehicle. For example, a vehicle's cooling system may be arranged in the front end, as shown in FIG. 1, to maintain an engine temperature within a suitable operating range as well as to cool a passenger cabin when cooling is requested. By fluidly coupling the vehicle cooling system to the engine so that heat-absorbing fluids may be circulated through the engine, a likelihood of engine overheating is reduced.

The cooling system may rely on a CMA to extract heat from fluids flowing from the engine and from an air conditioning system. A geometry of the CMA may have a significant effect on liquid-to-air heat transfer efficiency as well as a footprint of the CMA within a vehicle under-hood compartment. As described above, a radiator and a condenser may be co-planar in the CMA. In one example, the radiator and the condenser may together form a circular structure with radially spiraling cooling fins. In other examples, the CMA may have a semi-circular, oval, rectangular with clipped corners, or some other shape without corners. An example of a circular CMA 202 is shown in a front perspective view 200 in FIG. 2. In one example, the CMA 202 may be the CMA 110 of FIG. 1. The CMA 202 has a central axis 204 about which a frame, or bolster 203, of the CMA 202 may be mirror-symmetric. A set of reference axes 206 is provided and indicates a y-axis, an x-axis, and a z-axis. In some examples the y-axis may be parallel with a vertical direction, the x-axis parallel with a horizontal direction, and the z-axis parallel with a transverse direction.

A radiator 230 and a condenser 232 may be positioned in a central portion 212 of the CMA 202, co-planar with the x-y plane and spiraling within the x-y plane. The radiator 230 and the condenser 232 may be concentric, with the condenser 232 arranged outside of and surrounding the radiator 230. Details of geometries and structures of the radiator 230 and the condenser 232 are discussed further below.

The CMA 202 may have a bolster 203 that provides structural support to the CMS 200 and includes an upper bracket 208, a lower bracket 210, and the central portion 212 extending between the upper bracket 208 and the lower bracket 210. The upper bracket 208 may be a rigid structure extending along the x-axis that defines a top of the CMA 202 and includes wings 207 protruding out on either side of the CMA 202, perpendicular to the central axis 204. The lower bracket may also be a rigid component extending along the x-axis and defining a bottom of the CMA 202. A width, defined along the x-axis, of the lower bracket 210 may be narrower than the upper bracket 208. The upper bracket 208 may be configured to withstand higher loads, e.g. be more durable and strong, than the lower bracket 210 due to a proximity of the upper bracket 208 to a hood of the vehicle. The upper bracket 208 may directly absorb at least a portion of an impact generated by closing the hood, where a downwards motion of the hood is compelled by gravity. A hood latch recess 205 is included in the upper bracket 208 to accommodate a positioning of a hood latch against the upper bracket when the hood is closed.

The hood latch recess 205 may be disposed in a front surface 219 of the upper bracket 208, in a central region 209 of the upper bracket 208. A width of the hood latch recess 205, defined along the x-axis, may be much narrower than a width of the upper bracket 208 or of the lower bracket 210. A height of the hood latch recess 205, defined along the y-axis, may extend down from an upper surface 221 of the upper bracket 208 but extend a portion of and not along an entire height 223 of the upper bracket 208. A depth of the hood latch recess 205, defined along the z-axis, may extend into a portion of a thickness 225 of the upper bracket 208 from the front surface 219 of the upper bracket 208. The hood latch recess 205 may be configured to provide clearance for the hood latch to couple to a reciprocating mechanism in the vehicle front end to maintain the hood closed against vehicle motion until the hood latch is released by an operator.

The central portion 212 includes a first rim 214, a second rim 216, and structural support-providing spokes 218. The first rim 214 is circular and centered about a geometric center 209 of the CMA 202 and has a first radius 240. The second rim 216 is positioned below the first rim 214, along the y-axis, and has a semi-circular geometry so that the second rim 216 is concentric with the first rim 214 and circumferentially surrounds at least a portion of the first rim 214 within the x-y plane. In other words, with first rim 214 is positioned inside of the second rim 216, and both may be co-planar with one another and with the x-y plane. The second rim 216 extends from one of the wings 207 to the other of the wings 207 and couples the wings 207 of the upper bracket 208 to the lower bracket 210. An outer perimeter 250 of the CMA 202 is defined by the upper bracket 208 and the lower bracket 210 and portions of the second rim 216 extending between the wings 207 and the lower bracket 210. The first rim 214 and the second rim 216 are concentric with a second radius 238 of the second rim 216 larger than the first radius 240 of the first rim 214.

The spokes 218 may extend from one region of the outer perimeter 250 of the CMA 202 to another region of the outer perimeter 250, passing through the geometric center 209 of the first rim 214. In other words, each spoke of the spokes 218 is diametric, bisecting the CMA 202 along planes rotating about the geometric center 209. Thus the spokes 218 intersect at the geometric center 209. The spokes 218 may be coupled to the first rim 214 spaced evenly apart along a circumference 242 of the first rim 214. In one example, the spokes 218 may include a first portion 211 extending from the geometric center 209 to an inner surface 213 of the first rim 214 and a second portion 215 extending from an outer surface 217 of the first rim 214 to an inner surface 219 of the second rim 216. The first portion 211 and the second portion 215 may be aligned so that the first portion 211 and the second portion 215 are linear. In another example, each of the spokes 218 may be a single continuous unit extending from one side of the CMA 202 to an opposite side, through the first rim 214. As such, the first rim 214 may be adapted with slots, e.g., openings, to allow insertion of the spokes 218 through the first rim 214.

The spokes 218 may be aligned along a common plane shared with the first rim 214 and the second rim 216. The spokes 218 may maintain a position of the first rim 214 within the CMA 202 by spanning an entire distance between two oppositely oriented regions of the outer perimeter 250 of the CMA 202. The spokes 218 may extend between either the upper bracket 208 and the second rim 216, or across a width, the width defined along the x-axis, of the second rim 216, depending on a positioning of each of the spokes 218, the spokes all passing through the geometric center 209. For example, a first spoke 220 of the plurality of spokes 218 may extend along the central axis 204 between the upper bracket 208 to the second rim 216 proximate to the lower bracket 210. A second spoke 222 of the plurality of spokes 218 is oriented perpendicular to the first spoke 220 and extends horizontally across the second rim 216. A third spoke 224 of the spokes 218 extends diagonally across the CMA 202, coupling the upper bracket 208 at an upper end of the third spoke 224, with respect to the y-axis, to the second rim 216 at a lower end of the third spoke 224. In this way, the spokes 218 provide structural support to the CMA 202 along a range of radial angles, resisting compressive forces exerted downwards, with respect to the y-axis, on the bolster 203 of the CMA 202.

As an example, the upper bracket 208 may include the hood latch recess 205 in the front surface 219 of the upper bracket 208 to accommodate a fastening mechanism of the hood of the vehicle when the hood is closed. When the hood is closed, the hood may drop onto the upper bracket 205, contacting the hood latch 205 and imposing a force, indicated by arrow 234, proportional to a weight of the hood. The downwards force applied to the upper bracket 208 may be dispersed amongst the spokes 218 coupled to the upper bracket 205 and distributed evenly across the bolster 203, as indicated by arrows 236. At the wings 207, the downwards force may be absorbed by vehicle front end components positioned immediately below the wings 207 and configured to absorb impact, such as crush cans 450, as shown in FIG. 4. The force may be transmitted from the upper bracket 208 to the second rim 216 and the lower bracket 210 via the spokes 218 and absorbed by the lower bracket 210. The horizontally aligned second spoke 222 may resist transmission of the force along the first rim 214 and the second rim 216 in an outwards horizontal direction, e.g., away from the geometric center 209 along the x-axis, opposing expansion of the bolster 203 along the x-axis. A geometry of the bolster 203 may thus reduce a likelihood that the CMA 202 deforms due to compressive forces.

While the CMA 202 is shown with two rims and six spokes, other examples may vary in a number of rims and spokes depending on a size of the CMA. For example, in a vehicle with a larger engine, a larger CMA may be used which may include two concentric, circular rims surrounded by a semi-circular rim. The larger CMA may have more spokes, such as eight or ten spokes. In a smaller engine, a smaller CMA having fewer spokes may be included, such as four spokes. Furthermore, a thickness 244, measured along the radial direction and a depth 246, measured along the z-axis, of the spokes 218 may be increased in a larger CMA for a larger engine to increase a tensile strength of the spokes, and decreased in a smaller CMA for a smaller engine.

Figure 3:
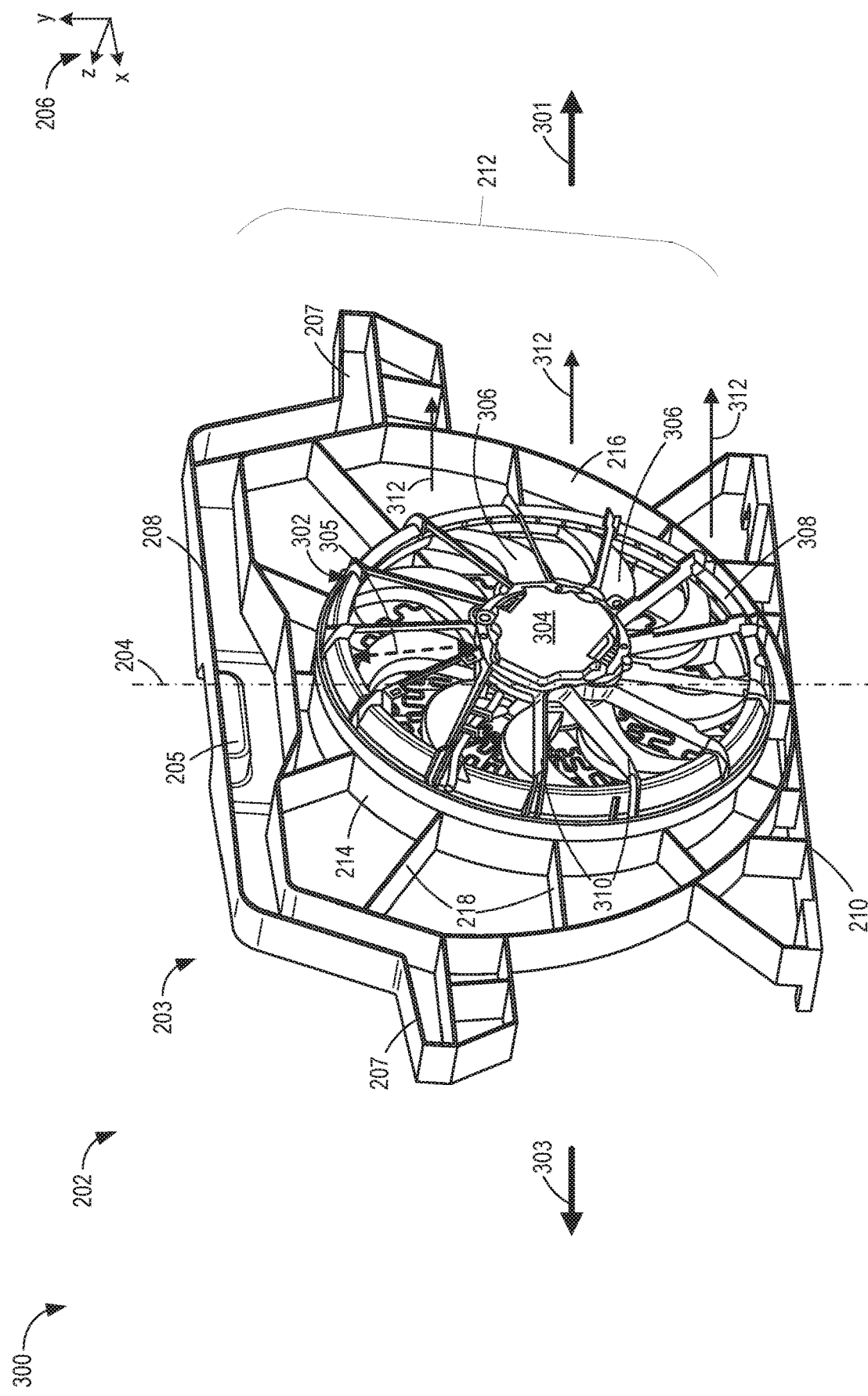
FIG. 3 shows a perspective rear view of the cooling module assembly.
Figure 4:
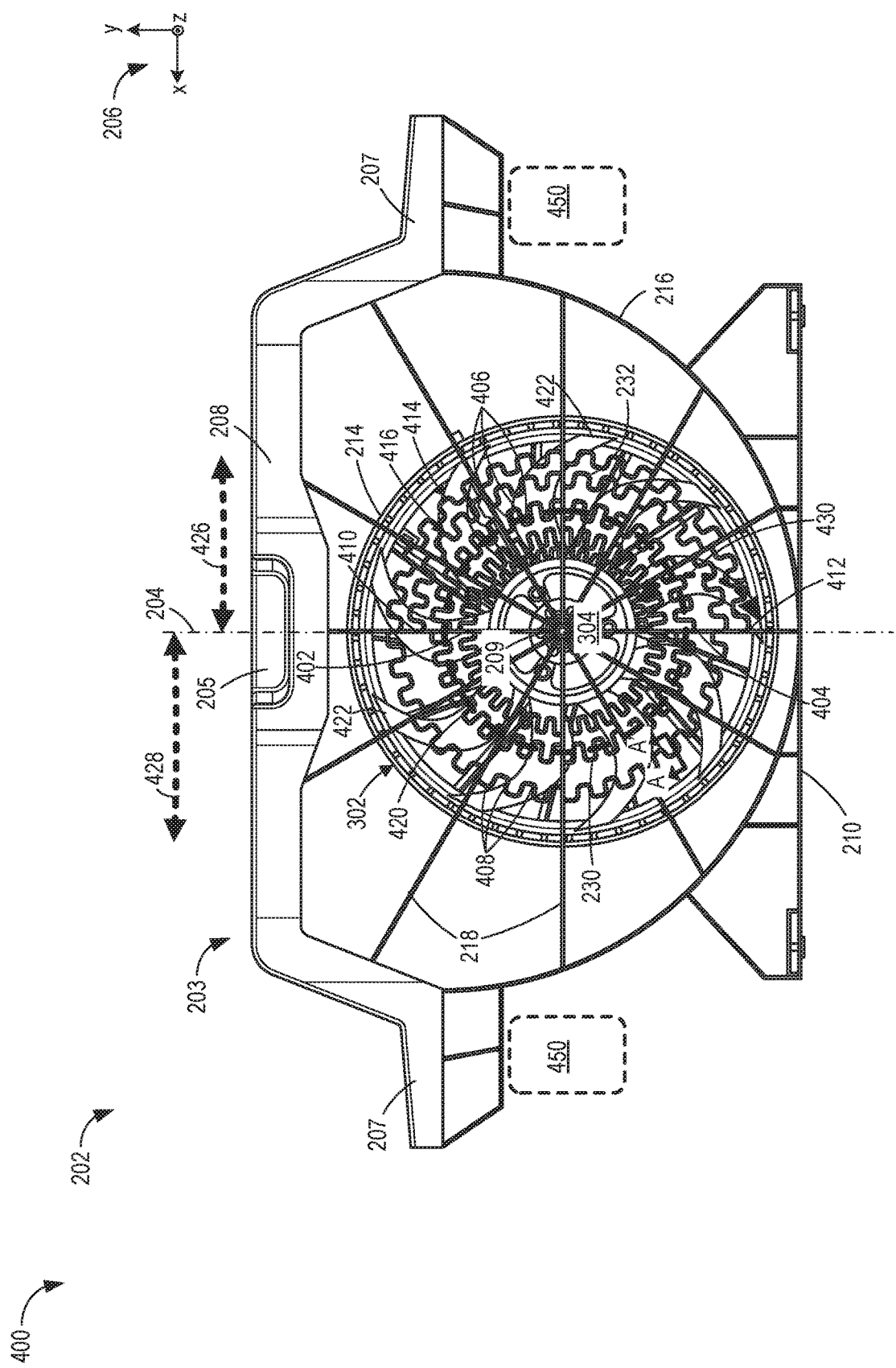
FIG. 4 shows a rear view of the cooling module assembly.

Turning now to FIG. 3, the CMA 202 may also include a fan 302 coupled to a rear side 301 of the CMA 202, as shown in a rear perspective view 300 of the CMA 202 in FIG. 3. A front side 303 of the CMA 202 is also indicated. The fan 302 may be used similarly as the cooling fan 91 of FIG. 1 and includes a hub 304 and a plurality of blades 306 coupled to the hub 304. The plurality of blades 306 of the fan 302 may be rotated by an electric motor connected to the hub 304, e.g., the motor 93 of FIG. 1. A length 305 of the plurality of blades 306 may be similar to a distance between the hub 304 and an outer rim 308 of the fan 302. A diameter of the fan 302 may be similar to a diameter of the first rim 214 so that the outer rim 308 of the fan 302 may be directly coupled to a rear-facing edge of the first rim 214. In other examples, a bladeless fan may be coupled to the rear side 301 of the CMA 202, and have a circular geometry similar to the circumference 242 of the first rim 214. The bladeless fan may be coupled to an electric, flowing air out of the bladeless fan in a rearwards direction away from the CMA 202, increasing air flow through the first rim 214 by entraining air.

The outer rim 308 of the fan 302 may be aligned with the first rim 214 and attached to the first rim 214 by, for example, fasteners, clamps, bolts, or other mechanism for securing the fan 302 to the CMA 202. In other examples, the CMA 202 may be additively manufactured so that the fan 302 is integrated into the CMA 202 as a single continuous unit, thereby reducing an assembly time per unit during manufacturing of the CMA 202. For example, the CMA 202 may be 3-D printed as a single continuous unit, including the bolster 203, the radiator 230, the condenser 232, and the fan 302.

The fan 302 may also include a plurality of spokes 310 to provide structural strength to the fan 302, similar to the spokes 218 of the bolster 203 of the CMA 202, and disperse compressive forces applied to the CMA 202. The plurality of spokes 310 may extend radially from the hub 304 to the outer rim 308 of the fan 302, evenly spaced apart along a circumference of the outer rim 308. The plurality of spokes 310 may be disposed behind the plurality of blades 306 of the fan 302 so that the plurality of spokes 310 do not impede rotation of the plurality of blades 306. The plurality of blades 306 may be rotated so that air flows in a rear-wards direction, as indicated by arrows 312. As the plurality of blades 306 rotate, a sweep of the plurality of blades 306 may be similar to a circular cross-sectional area (e.g., a cross-section taken along the x-y plane) bordered by the first rim 214 and by the outer rim 308 of the fan 302, drawing air through the cross-sectional area of the first rim 214 and the fan 302, also in the direction indicated by arrows 312.

During events where ram-air flow may be low, such as during vehicle idling, the fan 302 may be activated to increase air flow through the CMA 202. The fan 302 may be deactivated when ram-air flow increases, such as when the vehicle is in motion. Alternatively, the fan 302 may be configured to rotate and enhance air flow through the CMA 202 when increased cooling of the CMA 202 is desired, regardless of ram-air flow. For example, during engine operation under high loads, engine temperature may rise above a target temperature range. Detection of the rise above the target temperature range, e.g., by a temperature sensor positioned at the engine block, may trigger activation of the electric motor driving rotation of the fan 302 to increase liquid-to-air heat exchange across the radiator 230. When the temperature is cooled to within the target temperature range, the fan 302 may be deactivated.

Returning to FIG. 2, air drawn through the circular cross-sectional area of the first rim 214 may come into contact with the radiator 230 and the condenser 232. The radiator 230 and the condenser 232 may be centered about the geometric center 209, which may also be where the spokes 218 of the bolster 203 intersect. The radiator 230 and the condenser 232 are also shown in a front view 400 of the CMA 202 in FIG. 4. Each of the radiator 230 and the condenser 232 may be formed from a single strip of material, folded in a sinusoidal pattern to form the respective sets of fins. In other words, the radiator 230 may have a first meander line, meandering between the geometric center 209 and the condenser 232 and spiraling within the x-y plane. The condenser 220 may have a second meander line, meandering between the radiator 230 and the first rim 214.

In FIG. 4, the radiator 230 is depicted spiraling outwards from a first end 402, along the x-y plane, proximate to (and in front of) the hub 304 of the fan 302, concentrically around the hub 304, to a second end 404 of the radiator 230, the second end 404 farther away from the hub 304 than the first end 402. The radiator 230 may be a single, continuous cooling channel bent into a repeating sinusoidal pattern as the radiator 230 spirals outwards relative to the hub 304. The radiator 230 is shown in FIG. 4 to circle around itself e.g., circumferentially surround itself, one and a half times, arranged so that each ring of the radiator 230 is spaced away from adjacent rings. In other words, the cooling channel of the radiator 230 does not overlap with itself at any point.

The sinusoidal pattern of the radiator 230 forms fins 406 (hereafter, radiator fins 406) that may be arranged radially, relative to the geometric center 209, or tangentially, e.g., tangential to an overall circular shape formed by the radiator 230. The radiator fins 406 may be narrower in width relative to a depth of the radiator fins 406, a width 520 and a depth 522 of an example of a fin shown in FIG. 5, and the depth defined along the z-axis. A narrowness of the radiator fins 406 may minimize friction and drag generated by contact between air flowing through the CMA 202 and surfaces of the radiator fins 406.

The condenser 232 may be disposed between the radiator 230 and the first rim 214 of the bolster 203. The condenser 232 may be similarly shaped as the radiator 230, configured as a single continuous cooling channel bent into a sinusoidal pattern. The sinusoidal geometry of the condenser 232 may also form radially and tangentially oriented condenser fins 408. The condenser fins 408 may be narrower in width than a depth of the condenser fins 408, as shown by the width 520 and the depth 522 of the fin shown in FIG. 5. The geometry of the condenser 408, may also reduce friction and drag generated by contact between air flowing through the CMA 202 and surfaces of the condenser fins 408.

The condenser 232 may spiral from a first end 410, proximate to the radiator 230, outwardly along the x-y plane towards the first rim 214. The condenser 232 has a second end 412 that is positioned further, in a radial direction, from the radiator 230 than the first end 410 of the condenser 232. The condenser 232 is shown in FIG. 4 to spiral around itself by half of a circumference of an inner ring of the condenser 232, an outer half-circumference 414 of the condenser 232 spaced away from and surrounding an inner half-circumference 416. An outer radius 426 of the condenser 232 is smaller than a radius 428 of the first rim 214 so that both the condenser 232 and the radiator 230 are centered within the circular cross-sectional area of the first rim 214. In other words, the radiator 230 forms an inner ring of radiator fins 406 and the condenser forms an outer ring of condenser fins 408, both the radiator 230 and the condenser 232 circumferentially surrounded by the first rim 214 and positioned behind the first rim 214.

Figure 2:
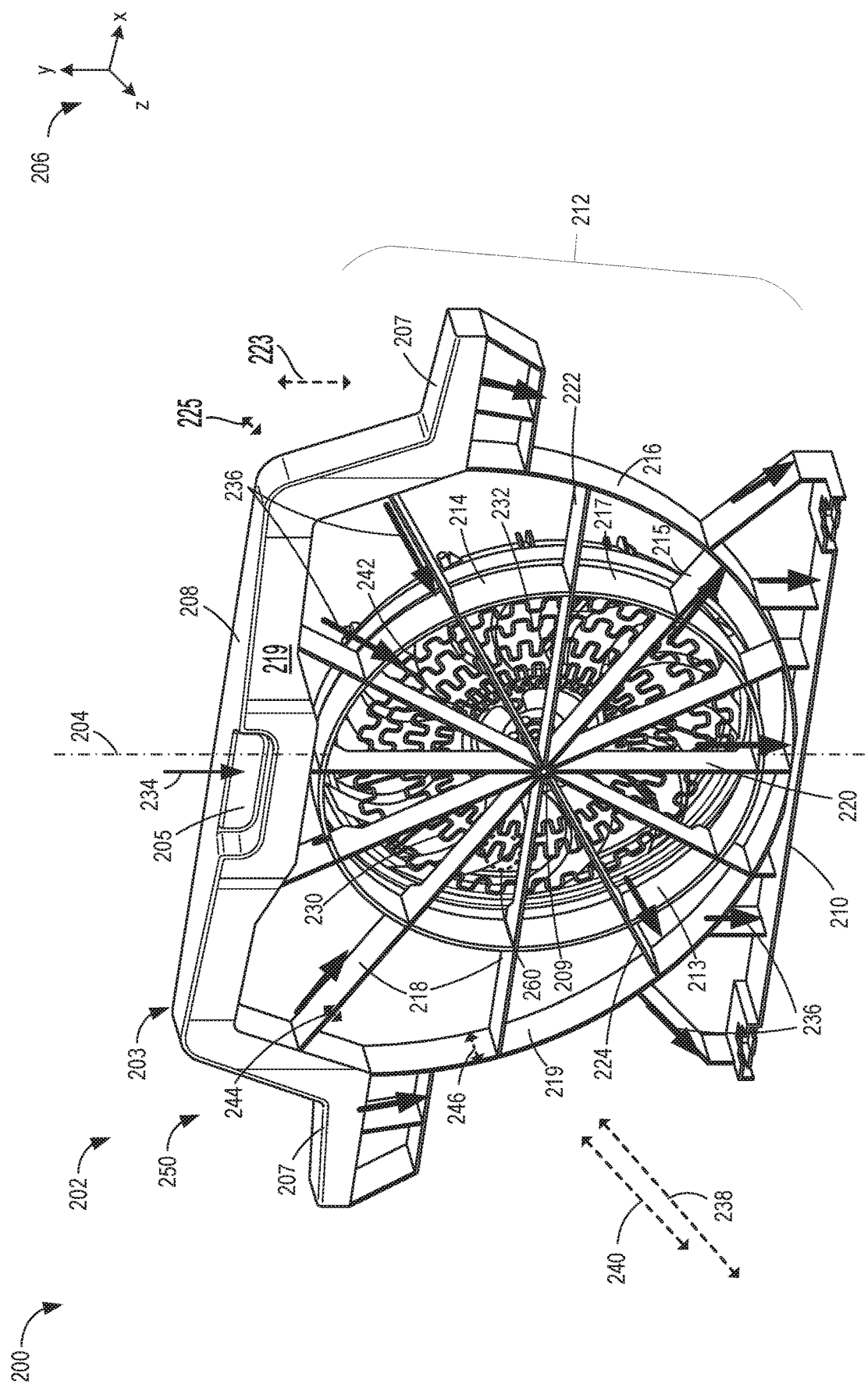
FIG. 2 shows a perspective front view of an example cooling module assembly that may be included in the vehicle.

It will be appreciated that the CMA 202 shown herein is a non-limiting example and while the radiator 230 is shown to spiral around itself by one and a half times and the condenser 232 to spiral around itself by half a circumference of the condenser 232, variations in configurations of the radiator 230 and the condenser 232 are possible without departing from the scope of the present disclosure. For example, in other embodiments of the CMA 202, the radiator 230 and the condenser 232 may each wrap around itself more or less times than shown in FIGS. 2 and 4. As an example, in a vehicle with a large engine, the condenser 232 may be configured as shown in FIGS. 2 and 4 but the radiator 230 may be lengthened and spiral around itself more than one and half times, such as two times or three times, to increase a surface area of the radiator 230 available for heat transfer. Furthermore, in some examples, the positions of the radiator 230 and the condenser 232 may be reversed, with the condenser 232 arranged inside of the radiator 230 along the x-y plane.

The circular, sinusoidal paths of both the condenser 232 and the radiator 230 may increase a surface area of each component across the x-y plane over which cooling air may flow relative to a circular, non-sinusoidal geometry. By increasing the surface area of both the radiator 230 and the condenser 232 exposed to air flow, transfer of heat from fluids flowing through inner passages of the radiator 230 and the condenser 232 may be augmented. As a result, liquid-to-air cooling through the radiator fins 406 and the condenser fins 408 may be more efficient.

The condenser 232 and the radiator 230 may be co-planar and may both be arranged behind the spokes 218 of the bolster 203. Positions of the condenser 232 and the radiator 230 within the CMA 202 may be maintained by attaching the condenser 232 and the radiator 230 to the spokes 218 along rear-facing edges of the spokes 218. Coupling of the condenser 232 and the radiator 230 to the rear-facing edges of the spokes 218 may be achieved by welding, if the components are fabricated independently, or may be 3-D printed as a continuous unit.

The condenser 232 may be positioned circumferentially outside of the radiator 230 to place the radiator 230 in a higher air flow velocity region than the condenser 232. Due to a geometry of the fan 302, a rotational speed of the plurality of blades 306 may be slowest at the hub and higher at the plurality of blades 306. As a result, air flow velocity through the CMA 202 may be lowest proximate to the hub 304 and highest proximate to a mid-point, indicated by dashed circle 420, along a length 430 of the plurality of blades 306. Air flow velocity through the CMA 202 between the mid-point 420 of the plurality of blades 306 and outer tips 422 of the plurality of blades 306 may decrease towards the outer tips 422 relative to air flow velocity at the mid-point 420.

The mid-point 420 of the plurality of blades 306 may align with the radiator 230, resulting in higher flow velocity through the radiator 230 than the condenser 232. The higher flow velocity through the radiator 230 may enhance convective cooling of a fluid flowing through the radiator 230, such as a coolant, relative to convective cooling of a fluid flowing through the condenser 232, such as a refrigerant. The increased cooling of the radiator 230 may be desirable due to much higher temperatures generated at the engine compared to a passenger cabin. For example, reducing an engine temperature of ≥110° C. during high engine loads to 90° C. may demand more rigorous liquid-to-air cooling than lowering a passenger cabin from 30° C. to 25° C. Furthermore, as overheating may lead to degradation of the engine while slow or inefficient cooling of the passenger cabin does not affect engine performance, cooling of the engine via the radiator 230 may be prioritized over cabin cooling. Positioning the radiator 230 in a region of highest air flow may prolong a useful lifetime and reduce maintenance and servicing of the engine.

Each of the radiator 230 and the condenser 232 may be formed from a single strip of material, folded in the sinusoidal pattern to form the respective sets of fins. To continuously flow fluid through both the radiator 230 and the condenser 232, each of the radiator fins 406 and the condenser fins 408 may be adapted with inner passages extending entirely throughout the strip of material forming each set of fins. As such, the radiator fins 406 and the condenser fins 408 are also cooling channels that flow coolant and refrigerant, respectively, continuously through the sinusoidal sets of fins. The flow of coolant and refrigerant may be maintained separate and independent of one another so that the coolant and refrigerant do not mix at any point along the radiator 230 or the condenser 232.

Figure 5:
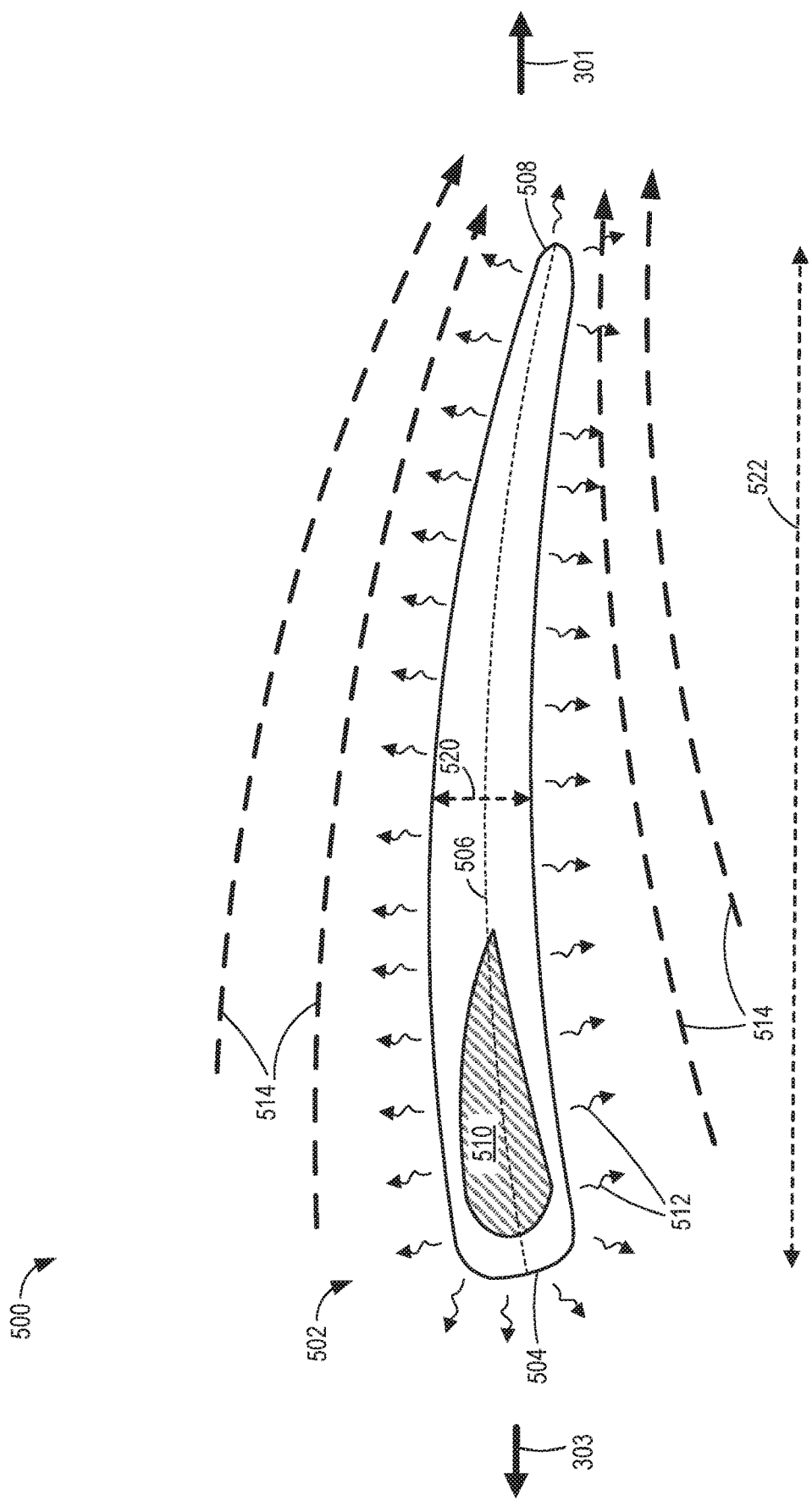
FIG. 5 shows a schematic illustration of a cross-section of a fin of the cooling module assembly.

Turning now to FIG. 5, a positioning of an inner passage within a cooling channel of a condenser of a CMA is shown in a cross-section 500 of a fin 502 formed from the cooling channel. The cross-section may be taken along line A-A' in FIG. 4 of one of the condenser fins 408. A cross-section of one of the radiator fins 406 may be similarly represented.

The fin 502 is shaped as an air foil with a broader, leading edge 504 that tapers along a camber line 506 to a narrow trailing edge 508. Between the leading edge 504 and the trailing edge 508, the fin 502 is curved, the curvature depicted by the camber line 506. The fin 502 may be oriented in the CMA so that the leading edge 504 is at the front side 303 of the CMA and the trailing edge 508 is at the rear side 301 of the CMA.

An inner passage 510 is disposed within a material of the fin 502, forming a chamber within the fin 502. The inner passage 510 has a geometry resembling a teardrop turned sideways in FIG. 5 but may have a variety of alternate shapes, such as oval, a rectangular with rounded corners, triangular, elliptical, etc. Fluid, such as refrigerant (or coolant if the fin is a radiator fin), may flow through the inner passage 510, thus the inner passage 510 may have smooth surfaces to minimize friction between the surfaces and the fluid. The fin 502 may be formed from a durable, rigid, heat conductive material, such as a composite or a metal. As heated fluid passes through the inner passage 510 of the fin 502, the heat is conducted from the fluid through the material of the fin and radiated from the fin 502 as shown by arrows 512. The radiating heat is transferred to air flowing past the fin 502 via convection. Efficient extraction of heat is thus dependent upon flow of air past the fin 502 and a ratio of surface area of the fin 502 relative to fluid volume within the inner passage 510 to maximize absorption of heat from the fluid and provide a large surface area of the fin 502 in contact with cooling air flow.

The air foil shape of the fin 502 allows the fin 502 to have a large surface area relative to a volume of the fin 502 as well as a volume of the inner passage 510, enabling efficient transfer of heat. The shape of the fin 502 also creates a pressure differential across a length of the fin 502, e.g., along the camber line 506. For example, at the front side 303 of the CMA where the leading edge 504 of the fin 502 is positioned, the broadness of the leading edge 504 may reduce spaces between the radiator fins and between the condenser fins, resulting in higher pressure relative to the rear side of the CMA. At the rear side of the CMA, trailing edges, e.g., the trailing edge 508 of the fin 502, of the radiator fins and the condenser fins have larger interstitial spaces, resulting in a lower air pressure at the rear side of the CMA compared to the front side. The pressure gradient draws air through the CMA, enabling smoother air flow between the fins than if the fins each had a uniform width along a camber line of the fins. The pressure gradient may also enhance convective heat transfer.

The radiator 230 and the condenser 232 may be further adapted with vanes, arranged parallel with the direction of air flow through the CMA 202 to increase the surface area of the radiator 230 and the condenser 232 and to assist in guiding air flow across the surfaces of the radiator 230 and the condenser 232. Dashed circle 260 shown in FIG. 2 is depicted in an expanded view 800 in FIG. 8. While the expanded view 800 of FIG. 8 shows a portion of the radiator 230, the condenser 232 may be similarly represented.

In FIG. 8, disc-shaped vanes 802 may encircle the fins 406 of the radiator 230, each of the vanes 802 spaced even apart from adjacent vanes 802. The vanes 802 may be oriented co-planar with the y-z plane and therefore co-planar with a direction of air flow across surfaces of the fins 406, as indicated by arrows 804. Two vanes 802 are illustrated in FIG. 8 for simplicity but the radiator 230 may include any number of vanes 802 disposed along the fins 406 of the radiator 230. For example, each of the fins 406 may be one, two, or three vanes 802 coupled to surfaces of the fins 406, arranged perpendicular to air flow so that the air contacts planar surfaces 806 of the vanes 802. The vanes 802 may have a diameter that varies according to dimensions of the radiator 230. For example, the vanes 802 may be 0.25 mm in diameter but may increase for a larger radiator or a radiator with thicker/wider fins 406. In this way, the vanes 802 increase an overall surface area of the radiator 230, enhancing convective transfer of heat from the radiator 230 to the air flowing across the radiator 230.

Returning to FIG. 4, the inner passages of the radiator 230 and the condenser 232 provide pathways for coolant and refrigerant flow, respectively. Coolant may be delivered to an inner passage of the radiator 230 at a radiator inlet (not shown) coupled to the first end 402 of the radiator 230. The coolant may flow through the radiator fins 406 from the radiator inlet and out through a radiator outlet (not shown), coupled to the second end 404 of the radiator 230. The radiator 230 may be included in a coolant loop circulating coolant continuously between an engine block and the radiator 230 when the engine is in operation. The coolant may extract heat from the engine block and flow to the radiator 230 where the heat is transferred through the material of the radiator 230 to air flowing past the radiator 230. As such, the radiator 230 may be formed from a heat-conductive material such as aluminum.

The condenser 232 may receive refrigerant from the air conditioning system at a condenser inlet (not shown) coupled to the first end 410 of the condenser 232. The refrigerant may flow through the condenser fins 408 from the condenser inlet and out through a condenser outlet (not shown), coupled to the second end 412 of the condenser 232. As the refrigerant, heated by an air conditioning compressor, flows through the condenser 232, the heat is conducted through the material of the condenser 232 and extracted by air flowing past the condenser 232, thereby cooling the refrigerant before the refrigerant is circulated to an air conditioning evaporator. The condenser 232 may also be formed from a similar heat-conductive material as the radiator 230.

The geometry of the radiator 230 and the condenser 232, with respect to the spiraling, sinusoidal configurations along the x-y plane, and the air foil shape of the radiator fins 406 and the condenser fins 408, enable increased convective transfer of heat from the CMA 202 to ram-air. Exposure of the radiator 230 and the condenser 232 to compressive downwards forces applied to the CMA 202, e.g., by closing the vehicle hood, may be minimized by surrounding the radiator 230 and the condenser 232 with the bolster 203, configured to distribute and absorb the imposed load. In addition to enhancing the cooling efficiency of the CMA 202, integrating the radiator 230 and the condenser 232 into a single, planar unit allows the CMA 202 to resist compressive loads while reducing a footprint of the CMA 202 compared to a conventional cooling system, as illustrated in a profile view 900 of the CMA 202 in FIG. 6. In an alternate embodiment, the arrangement of the condenser 232 and the radiator 230 may be reversed so that the condenser is circumferentially surrounded by and inside of the radiator 230 in the x-y plane.

Figure 6:
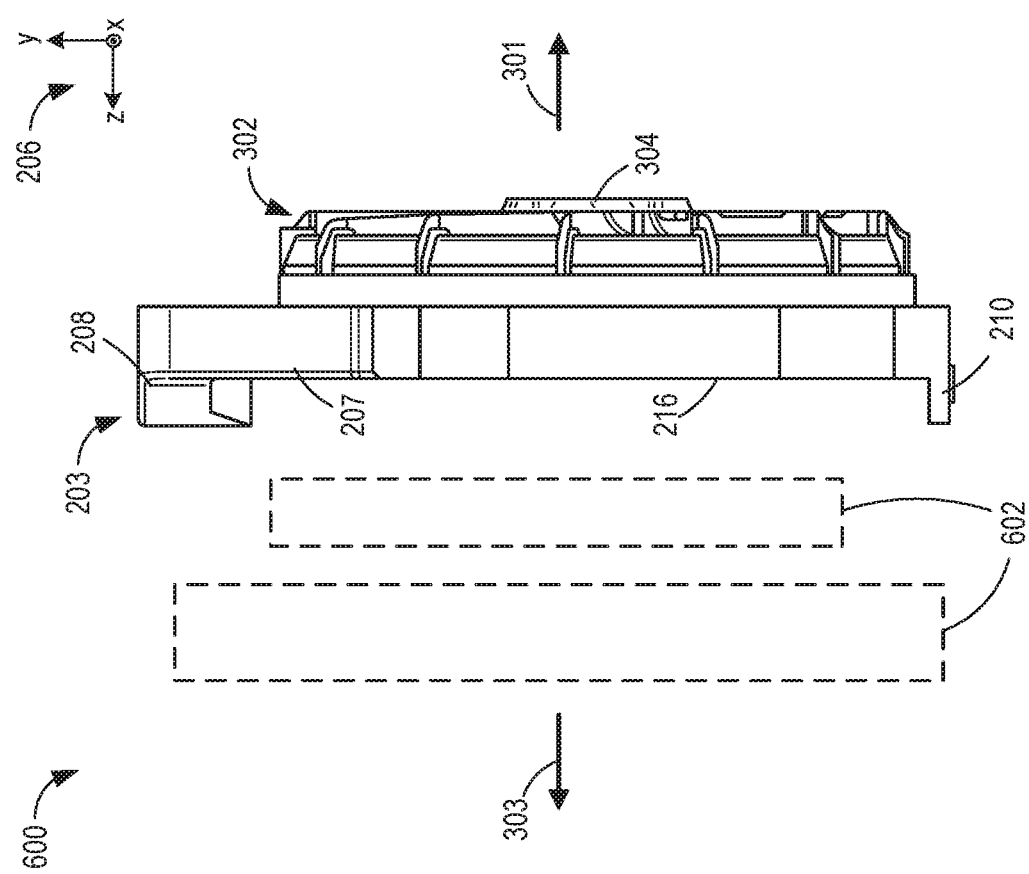
FIG. 6 shows a profile view of the cooling module assembly.

Turning to FIG. 6, the profile view 600 of the CMA 202 shows a compact profile of the CMA 202. A conventional stacking of components 602, such as a condenser, a charge air cooler, and other auxiliary coolers, in front of a radiator is eliminated by integrating the condenser and radiator into one unit sharing a common plane. By positioning the radiator and the condenser co-planar, a footprint of the CMA is reduced, freeing space within the vehicle front end for other components. In addition, the CMA may be additively manufactured, such as by 3-D printing, as a single unit, thereby reducing costs associated with fabrication and assembly.

Figure 7:
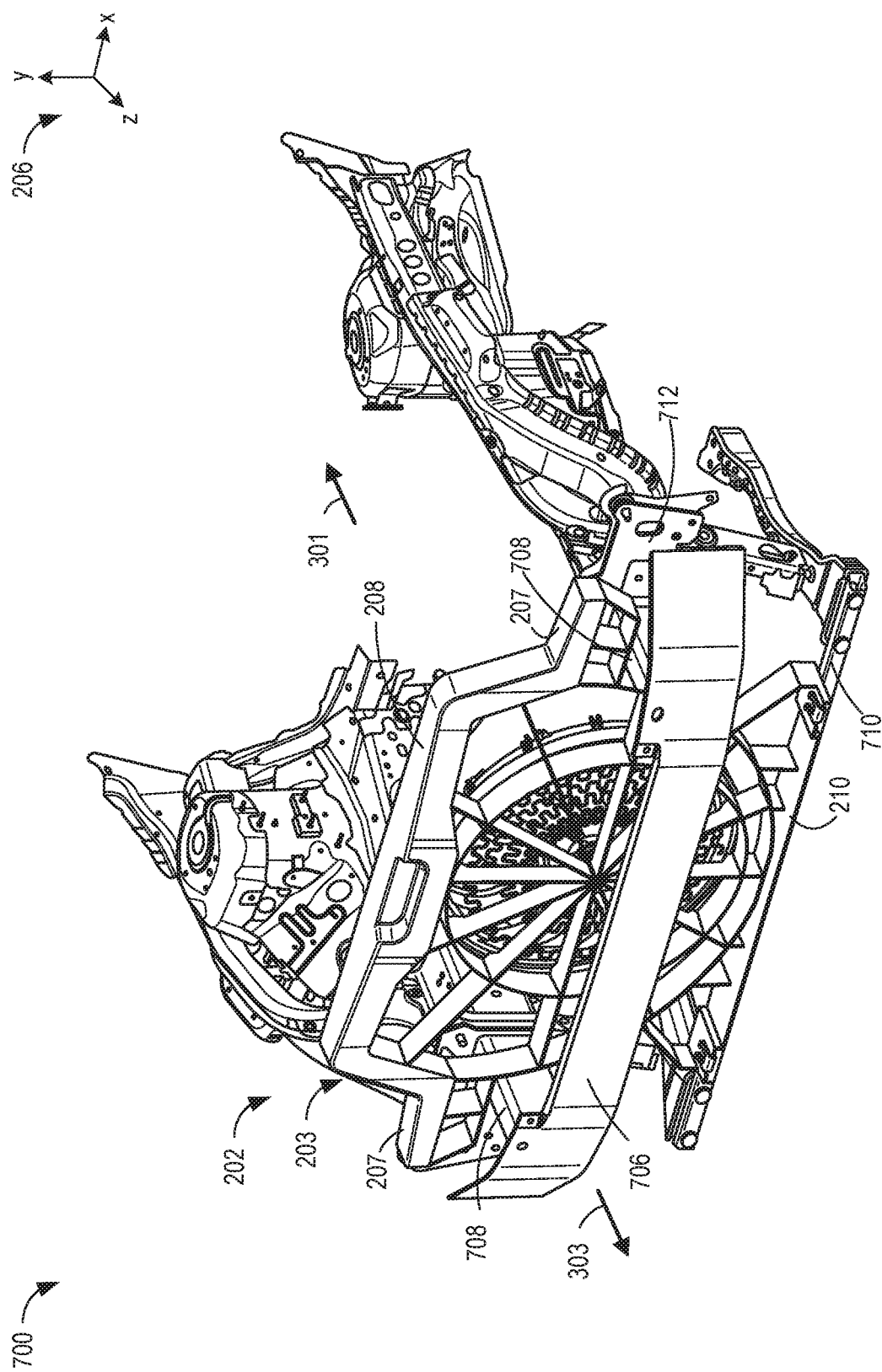
FIG. 7 shows a perspective view of components of a vehicle front end, including the cooling module assembly.

An arrangement of the CMA 202 within a front end structure 700 of a vehicle is shown in FIG. 7. The front end structure 700 may be disposed in an under-hood compartment of the vehicle, such as the under-hood compartment 103 of FIG. 1. The CMA 202 is positioned at a forwards region of the front end structure 700, immediately behind a front bumper beam 706. An engine may be located in a space behind the CMA 202. Crush cans 708 may be disposed below the wings 207 of the upper bracket 208 of the CMA 202 to absorb impact transmitted through the front bumper beam 706 and through the CMA 202.

The CMA 202 may be secured in place within the front end structure 700 by coupling the lower bracket 210 to a swaybar 710. The wings 207 of the CMA 202 may be attached to side aprons 712 of the front end structure 700. A position of the CMA 202 is thus maintained despite bouncing of the vehicle during operation and vibrations transmitted to the CMA 202 from mechanical and electrical components of the vehicle.

In this way, a cooling system of a vehicle may utilize a cooling module assembly (CMA) to efficiently cool an engine and a passenger cabin with a reduced footprint in the vehicle's front end compartment. The CMA includes a radiator and a condenser, each formed from a continuous cooling channel adapted with an inner passage for flowing a fluid and folded into a sinusoidal pattern to form fins. The folded cooling channels are arranged so that the cooling channels spiral in a common plane in a central region of the CMA, forming a circular structure. The fins, from a cross-sectional perspective, may have an air foil shape that increases liquid-to-air heat exchange and promotes smooth air flow through the CMA across surfaces of the fins. The radiator and the condenser are concentric and co-planar, the radiator circumferentially surrounded by the condenser. As a result of the arrangement of the radiator inside of the condenser, the radiator may be cooled by air flowing at a higher velocity than through the condenser, increasing heat extraction from radiator coolant and providing more effective engine cooling. The CMA additionally includes a bolster providing structural support to the radiator and the condenser. The bolster may be configured to receive external forces imposed on the CMA and disperse the forces uniformly across the CMA. The CMA thereby enhances a cooling efficiency of both the radiator and condenser and a capacity of the CMA to withstand compressive loads while maintaining a low footprint within the front compartment of the vehicle.

The technical effect of configuring a vehicle with the circular cooling module assembly is that cooling efficiencies of the radiator and the condenser are enhanced while allowing for a cooling assembly that occupies less packing space. Additionally, the circular cooling module assembly may be less prone to deforming due to structural stability provided by the bolster. The cooling module assembly may be more easily manufactured as a single unit, thereby reducing production costs.

As a first embodiment, an integrated cooling system includes a frame with an upper bracket, a lower bracket, an inner rim and an outer rim, a first continuous passage coupled to the frame as a first meander line having a first radius and circulating a first fluid, and a second continuous passage coupled to the frame as a second meander line having a second, larger radius, the second passage circulating a second fluid and arranged co-planar with the second passage. In a first example of the cooling system, the first passage has an inlet arranged at a first end and an outlet at a second end and the first passage spirals between the inlet and the outlet within a vertical plane within a circumference of the inner rim. A second example of the cooling system optionally includes the first example, and further includes, wherein the second passage has an inlet arranged at a first end and an outlet arranged at a second end and the second passage spirals between the inlet and the outlet in a region between the first passage and the inner rim. A third example of the cooling system optionally includes one or more of the first and second examples, and further includes, wherein the second passage and the first passage are circular and concentric, the second passage circumferentially surrounding the first passage. A fourth example of the cooling system optionally includes one or more of the first through third examples, and further includes, wherein a periphery of the cooling system is defined by the upper and lower support brackets and portions of the outer rim extending between the upper and lower support brackets. A fifth example of the cooling system optionally includes one or more of the first through fourth examples, and further includes, wherein the inner rim is circular and the outer rim is semi-circular, the inner having a smaller radius than the outer rim and arranged concentric with and inside of the outer rim. A sixth example of the cooling system optionally includes one or more of the first through fifth examples, and further includes, a plurality of spokes, each spoke of the plurality of spokes extending from a first region along the periphery of the cooling system to a second region along the periphery, the second region on an opposite side of the integrated cooling system from the first region. A seventh example of the cooling system optionally includes one or more of the first through sixth examples, and further includes, wherein each spoke of the plurality of spokes passes through a geometric center of the inner rim and a first portion of each spoke extends between the geometric center and an inner surface of the inner rim and and second portion of each spoke extends between an outer surface of the inner rim to the periphery of the cooling system, the first and second portions linearly aligned. A eighth example of the cooling system optionally includes one or more of the first through seventh examples, and further includes, wherein the first meander line forms a first set of sinusoidal fins and the second meander line forms a second set of sinusoidal fins and wherein the first and second sets of fins are shaped as air foils with a broader edge of the air foils positioned at a front side of the cooling system and a tapered edge positioned at the rear side of the cooling system. A ninth example of the cooling system optionally includes one or more of the first through eighth examples, and further includes, wherein the upper bracket includes a pair of wings extending along a horizontal direction in opposite directions away from a central region of the upper bracket. A tenth example of the cooling system optionally includes one or more of the first through ninth examples, and further includes, wherein the upper bracket has a recess configured to couple to a fastening latch of a vehicle hood. An eleventh example of the cooling system optionally includes one or more of the first through tenth examples, and further includes an electric fan coupled to a rear facing edge of the inner rim. A twelfth example of the cooling system optionally includes one or more of the first through eleventh examples, and further includes, wherein the first fluid is a coolant and the second fluid is a refrigerant.

As another embodiment, an integrated cooling system module includes a bolster defining an outer perimeter of the cooling system module, a first passage spiraling between a first fluid inlet and first fluid outlet to form a first region of sinusoidal fins coupled to the bolster, the first region having a first circumference, a second passage spiraling between a second fluid inlet and a second fluid outlet to form a second region of sinusoidal fins also coupled to the bolster, the second region having a second circumference and concentric with the first region to form a circular co-planar structure framed by the bolster. In a first example of the cooling system module, sinusoidal fins of the first passage and the sinusoidal fins of the second passage include disc-shaped vanes arranged perpendicular to a flow of air across surfaces of the sinusoidal fins. A second example of the cooling system module optionally includes the first example, and further includes wherein the first passage is positioned in a region of higher air flow velocity than the second passage. A third example of the cooling system module optionally includes one or more of the first and second examples, and further includes, wherein the bolster is coupled to a front end of the vehicle to maintain a position of the cooling module within the vehicle front end.

As another embodiment, a cooling system includes a first circular heat exchanger formed from a cooling channel folded into a sinusoidal pattern, a second circular heat exchanger concentric with and circumferentially surrounding the first heat exchanger, the second heat exchanger also formed from a cooling channel folded into a sinusoidal pattern, and a rigid supporting structure configured to couple the cooling system to a vehicle front end. In a first example of the cooling system, the rigid supporting structure is configured to absorb external forces imposed on the cooling system and disperse the external forces uniformly across the cooling system. A second example of the cooling system optionally includes the first example, and further includes, wherein the cooling system is configured to be 3-D printable as an integrated unit. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An integrated cooling system comprising:
   a frame with an upper bracket, a lower bracket, an inner rim, an outer rim and a plurality of spokes configured to disperse compressive forces applied to the frame;
   a first continuous passage coupled to the frame as a first meander line having a first radius and circulating a first fluid; and
   a second continuous passage coupled to the frame as a second meander line having a second, larger radius, the second passage circulating a second fluid and arranged co-planar with the first passages;
   wherein the first and second passages are arranged behind the plurality of spokes relative to a front side of the integrated cooling system.

2. The integrated cooling system of claim 1, wherein the first passage has an inlet arranged at a first end and an outlet at a second end and the first passage spirals between the inlet and the outlet within a vertical plane within a circumference of the inner rim.

3. The integrated cooling system of claim 2, wherein the second passage has an inlet arranged at a first end and an outlet arranged at a second end and the second passage spirals between the inlet and the outlet in a region between the first passage and the inner rim.

4. The integrated cooling system of claim 3, wherein the second passage and the first passage are circular and concentric, the second passage circumferentially surrounding the first passage.

5. The integrated cooling system of claim 1, wherein a periphery of the cooling system is defined by the upper and lower brackets and portions of the outer rim extending between the upper and lower brackets.

6. The integrated cooling system of claim 5, wherein the inner rim is circular and the outer rim is semi-circular, the inner having a smaller radius than the outer rim and arranged concentric with and inside of the outer rim.

7. The integrated cooling system of claim 5, wherein each spoke of the plurality of spokes extends from a first region along the periphery of the cooling system to a second region along the periphery, the second region on an opposite side of the integrated cooling system from the first region.

8. The integrated cooling system of claim 7, wherein each spoke of the plurality of spokes passes through a geometric center of the inner rim and a first portion of each spoke extends between the geometric center and an inner surface of the inner rim and second portion of each spoke extends between an outer surface of the inner rim to the periphery of the cooling system, the first and second portions linearly aligned.

9. The integrated cooling system of claim 1, wherein the first meander line forms a first set of sinusoidal fins and the second meander line forms a second set of sinusoidal fins and wherein the first and second sets of fins are shaped as air foils with a broader edge of the air foils positioned at a front side of the cooling system and a tapered edge positioned at a rear side of the cooling system.

10. The integrated cooling system of claim 1, wherein the upper bracket includes a pair of wings extending along a horizontal direction in opposite directions away from a central region of the upper bracket.

11. The integrated cooling system of claim 1, wherein the upper bracket has a recess configured to couple to a fastening latch of a vehicle hood.

12. The integrated cooling system of claim 1, further comprising an electric fan coupled to a rear facing edge of the inner rim.

13. The integrated cooling system of claim 1, wherein the first fluid is a coolant and the second fluid is a refrigerant.

14. An integrated cooling system module for a vehicle, comprising:
    a bolster defining an outer perimeter of the cooling system module and including a plurality of spokes extending radially across the outer perimeter;
    a first passage spiraling between a first fluid inlet and first fluid outlet to form a first region of sinusoidal fins coupled to the bolster, the first region having a first circumference; and
    a second passage spiraling between a second fluid inlet and a second fluid outlet to form a second region of sinusoidal fins also coupled to the bolster, the second region having a second circumference and concentric with the first region to form a circular co-planar structure framed by the bolster and positioned behind the plurality of spokes relative to a front end of the vehicle.

15. The integrated cooling system module of claim 14, wherein sinusoidal fins of the first passage and the sinusoidal fins of the second passage include disc-shaped vanes arranged perpendicular to a flow of air across surfaces of the sinusoidal fins.

16. The integrated cooling system module of claim 14, wherein the first passage is positioned in a region of higher air flow velocity than the second passage.

17. The integrated cooling system module of claim 14, wherein the bolster is coupled to the front end of the vehicle to maintain a position of the cooling module within the vehicle front end.

18. A cooling system, comprising:
    a first circular heat exchanger formed from a cooling channel folded into a sinusoidal pattern;
    a second circular heat exchanger concentric with and circumferentially surrounding the first heat exchanger, the second heat exchanger also formed from a cooling channel folded into a sinusoidal pattern; and
    a rigid supporting structure configured to couple the cooling system to a vehicle front end, the rigid supporting structure including radially arranged spokes arranged in front of both the first heat exchanger and the second heat exchanger.

19. The cooling system of claim 18, wherein the rigid supporting structure is configured to absorb external forces imposed on the cooling system and disperse the external forces uniformly across the cooling system.

20. The cooling system of claim 18, wherein the cooling system is configured to be 3-D printable as an integrated unit.

\* \* \* \* \*